United States Patent
Ströder et al.

(10) Patent No.: US 10,793,928 B2
(45) Date of Patent: Oct. 6, 2020

(54) PLANT AND METHOD FOR THE THERMAL TREATMENT OF SOLIDS

(71) Applicant: OUTOTEC (FINLAND) OY, Espoo (FI)

(72) Inventors: Michael Ströder, Frankfurt am Main (DE); Roberto Valery, Oberusel (DE); Sebastian Lang, Darmstadt (DE); Suvi Rannantie, Frankfurt am Main (DE); Vincent Siauw, Frankfurt am Main (DE); Gergö Rimaszeki, Oberursel (DE)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/798,735

(22) Filed: Feb. 24, 2020

(65) Prior Publication Data
US 2020/0190613 A1    Jun. 18, 2020

Related U.S. Application Data

(63) Continuation of application No. PCT/EP2017/072102, filed on Sep. 4, 2017.

(51) Int. Cl.
*C21D 9/00* (2006.01)
*C21D 1/60* (2006.01)
(Continued)

(52) U.S. Cl.
CPC ............ *C21D 9/0062* (2013.01); *C21D 1/60* (2013.01); *C21D 1/667* (2013.01); *B01J 8/006* (2013.01); *F27B 15/14* (2013.01); *F27B 15/16* (2013.01)

(58) Field of Classification Search
CPC ............ C21B 2100/06; C21B 2100/02; C21B 2100/60; C21B 2100/62; C21D 9/0062; C21D 1/60; C21D 1/667
See application file for complete search history.

(56) References Cited

U.S. PATENT DOCUMENTS

| 3,246,978 A | 4/1966 | Porter, Jr. |
| 2016/0348195 A1* | 12/2016 | Achatz ...................... C12P 7/30 |

FOREIGN PATENT DOCUMENTS

| DE | 102012109284 A1 | 3/2014 |
| EP | 0606573 A1 | 7/1994 |

(Continued)

OTHER PUBLICATIONS

International Search Report issued by the European Patent Office acting as the International Searching Authority in relation to International Application No. PCT/EP2017/072102 dated May 17, 2018 (4 pages).

(Continued)

*Primary Examiner* — Scott R Kastler
(74) *Attorney, Agent, or Firm* — Robert P. Michal, Esq.; Carter, DeLuca & Farrell LLP (57) ABSTRACT

A method and its related plant for the thermal treatment of iron containing oxide, in which fine-grained solids are heated in a preheating calcining stage and exposed to a reduction gas in a subsequent reduction stage. Off-gas from the reduction stage is guided through a separation device wherein water originating from the reduction stage is separated. The water separated in the separation device is recycled into a water treatment section, from which the recycled water is supplied to a water electrolysis plant and/or a steam reforming plant producing hydrogen, and the produced hydrogen is supplied to the reduction stage as reductant and/or to the preheating calcining stage as fuel (Continued)

and/or to the gas heater as fuel and/or from which the recycled water is supplied to the separation device.

13 Claims, 2 Drawing Sheets

(51) Int. Cl.
    *C21D 1/667*     (2006.01)
    *B01J 8/00*     (2006.01)
    *F27B 15/14*     (2006.01)
    *F27B 15/16*     (2006.01)

(56) References Cited

FOREIGN PATENT DOCUMENTS

| WO | 2010131753 | A1 | 11/2010 |
| WO | 2011116141 | A2 | 9/2011 |

OTHER PUBLICATIONS

Written Opinion of the International Searching Authority issued by the European Patent Office acting as the International Searching Authority in relation to International Application No. PCT/EP2017/072102 dated May 17, 2018 (6 pages).

International Preliminary Report on Patentability issued by the European Patent Office acting as the International Preliminary Examining Authority in relation to International Application No. PCT/EP2017/072102 dated Jul. 24, 2019 (6 pages).

* cited by examiner

PLANT AND METHOD FOR THE THERMAL TREATMENT OF SOLIDS

CROSS-REFERENCE TO RELATED APPLICATIONS

This application is a continuation of PCT International Application No. PCT/EP2017/072102 filed Sep. 4, 2017, the disclosure of this application is expressly incorporated herein by reference in its entirety.

The invention relates to a method and to a respective plant for the thermal treatment of iron containing oxide, in which fine-grained solids are heated in a preheating calcining stage and are exposed to a reduction gas in a subsequent reduction stage, wherein off-gas from the reduction stage is guided through a separation device, separating the water originating from the reduction stage.

For the thermal treatment of iron containing oxide, especially hydrogen based direct reduction processes for iron ore, fine-grained solids are heated in a preheating calcining stage and are exposed to a reduction gas in a subsequent reduction stage, wherein off-gas from the reduction stage is guided through a separation device, separating the water originating from the reduction section. In this context, the so-called Circored Process, e.g. described in WO 2005/116273 A1, is often used.

The fine iron containing particles are passed to a first fluidized bed, preferably a circulating fluidized bed (CFB), which acts as a preheating and calcination stage. The heat required is generated by the combustion of natural gas with air into the fluidized bed. Typical calcination temperatures are between 800 and 1000° C.

Afterwards, at least a portion of the calcined particles is withdrawn from the first fluidized bed and enters a second fluidized bed reactor, preferably a circulating fluidized bed reactor, for being charged to the reduction step wherein a reducing gas, for example hydrogen, is used to remove oxygen from the hot iron ore producing metallized iron and water as a byproduct. In the reduction step, the fines are reduced to about 60-70% metallization. If a higher percentage of reduction is desired it is possible to charge the partly metallized particles into a third fluidized bed reactor, preferably a stationary fluidized bed reactor, wherein they are again contacted with a reduction gas, e.g. hydrogen. In this third fluidized bed reactor, about 75 to 95% metallization can be achieved. This intermediate product is called Direct Reduced Iron (DRI).

Afterwards, the DRI leaves the series of fluidized bed reactors and is briquetted, i.e. compacted at elevated temperatures of about 650 to 700° C. The product is then called Hot Briquetted Iron (HBO. For storage and transportation, the HBI needs to be cooled. The cooling is normally achieved by direct contact with water in so-called vibratory cooling conveyors, whereby water is evaporated. The evaporated water vapor can contain solid dust particles and has therefore to be cleaned in a gas cleaning equipment. Normally, a so-called waste gas scrubber, consisting of an evaporative venturi section, is applied for this purpose.

Water vapor occurs in different stages of the process: The entrained dust in the off-gas from the preheating section is typically removed using an evaporative venturi scrubber before venting the off-gas to the atmosphere. In the reduction section comprising the circulating fluidized bed and the fluidized bed reactor, a packed bed venturi scrubber is used to remove water vapor from the reduction process and entrained particles from the reducing gas.

In the preheating section, water from the iron ore moisture and from the combustion of fuel gas is partially lost in the venturi scrubber, because the venturi scrubber is normally designed to release saturated off-gas at temperatures between 50 and 100° C., preferably between 60 and 95° C. The purpose of this equipment is to control the dust emission, preferably to a maximum of 50 mg/Nm$^3$. However, the equipment cannot condense and remove water vapor from the off-gas stream. Similar water losses occur in the waste gas scrubber, where vapors from the vibratory cooling conveyors are released to the atmosphere. Thereby approximately 65 wt.-% of the total input water is lost.

In addition, the fired gas heaters which are normally applied in the reduction section to heat up the reducing gas by means of indirect heat transfer are typically based on natural gas combustion with air, whereby water vapor as a byproduct of the combustion is lost to the atmosphere.

So, the disadvantage of the state of the art is high water consumption due to the loss of water vapor to the atmosphere by the off-gases from the preheating section and the briquetting machine area of the Circored process, all leaving the process at typical temperatures between 50° C. and 100° C. and saturated with water vapor.

If hydrogen is used in the Circored process as reducing gas or fuel gas and the hydrogen is to be generated by water electrolysis, this implies large volume flows of fresh water consumption. For example, coupling a Circored plant and a water electrolysis plant without closing the water loop would need 1.5 m$^3$ of make-up water per ton of Hot Briquetted Iron (HBI). In the case of a Circored plant of 500 000 tons per year of HBI production, the plant would need 750 000 m$^3$ of fresh water per year. Such amounts of water are not available in certain regions around the world or are at least too expensive for such a process to be economically feasible.

It is, therefore, the object of the present invention to provide a process and its relating plant for the thermal treatment of iron containing oxide with reduced water consumption.

Fine-grained solids are heated in a preheating calcining stage, preferably up to temperatures of 850 to 1200° C., more preferably 900 to 1100° C., most preferably about 1000° C., for a subsequent thermal treatment process in the absence or limited supply of air or oxygen applied to ores and other solid materials to bring about a thermal decomposition.

Afterwards, the solid particles are exposed to a reduction gas in a reduction stage. The off-gas from the reduction stage is guided through a separation device, separating dust and part of the water originated in the reduction stage. In the separation device, the water can be condensed and collected for further use.

It is an essential part of the invention that the off-gas from the preheating section is guided through a venturi scrubber, for removing the solids and cooling to vapor/liquid equilibrium and through a packed bed section downstream of the venturi scrubber for separating a significant portion of the water vapor by condensation, i.e. as liquid water. Thereby, the off-gas of the preheating section is cooled down and released, preferably at a temperature below 75° C., and part of the water in the off-gas is condensed and removed from the off-gas flow.

The packed bed section can have countercurrent flow of the upwards streaming off-gas and the cold process water running downwards. The cold process water has preferably ambient temperature, e.g. temperatures between 5 and 30° C.

The packed bed can contain irregular shaped polyethylene (PE) tellerettes or other packings, which create a large surface area to increase the contact between falling liquid and rising gas.

The water produced in the preheating section of the Circored process consists of water from the combustion of fuel (e.g. mixture of natural gas, hydrogen and process bleed gas from the reduction stage) and the moisture of the fine-grained solids, for example the raw iron ore. Typical iron ore moistures vary from 3 to 12 wt.-% related to the overall iron ore mass.

The invention can also be applied to the reduction or pre-reduction of other iron containing ores like ilmenite, ferro-vanadium, titanomagnetites, iron sands, ferro-nickel and others. The invention can also be applied to direct reduction processes using a mixture of $H_2$, CO, $CO_2$, $CH_4$ and $H_2O$ as a gaseous reductant.

In a preferred embodiment of the invention, the preheating calcining stage and/or at least one stage of the reduction stage comprises a circulating fluidized bed reactor. Thereby, very good heat and mass transfer coefficients are ensured and, thereby, a very homogeneous product quality.

In another preferred embodiment of the invention, the reducing gas in the reduction stage is heated by indirect heat transfer with at least one fired gas heater. The flue-gas from the at least one gas heater is guided through a separation device, preferably a packed bed column, for separating water in liquid form by condensation. Water vapor from the combustion in the fired gas heater can be condensed by feeding the flue-gas through a packed bed column in an upward flow with countercurrent flow of cold process water in a downward flow. The mass flow of water which can be gained from the gas heaters can be increased by combustion with oxygen or oxygen enriched air instead of ambient air. The more $H_2$ is contained in the fuel of the fired gas heater, the lower is the $CO_2$ concentration in the off-gas, decreasing the carbon footprint of the iron ore reduction plant. If the fuel provided to the gas heater is pure hydrogen which is combusted with pure oxygen, the off-gas volume flow downstream the packed bed column is getting very small, basically consisting just of the excess oxygen offered for complete combustion and a very small concentration of water vapor according to the gas/liquid equilibrium at the temperature of the packed bed column. To control the flame temperature, part of the flue-gas upstream of the packed bed column can be recycled.

In another preferred embodiment of the invention, the reduced solids are briquetted at high temperatures and the briquettes are subsequently cooled to approximately 80° C. in a quench cool, preferably a vibratory cooling conveyor. Water vapor generated in the vibratory cooling conveyor can be condensed and recovered as liquid water in a separation device in a similar way as in the off-gas venturi scrubber and packed bed section of the preheating section mentioned above.

In another preferred embodiment of the invention, the fuel for the preheating section is shifted towards hydrogen, which means a higher concentration of water vapor in the off-gas. In another preferred embodiment of the invention, the hydrogen content in the fuel gas used in the at least one fired gas heater is at least 20 v/v.-%. Since hydrogen can easily be produced from renewable sources, e.g. renewable electricity or biomass, this allows for a reduced requirement of fossil fuel for the entire process. It also allows for a higher mass flow of liquid water separated from the process chain as a by-product.

In another preferred embodiment of the invention, the water separated in at least one venturi scrubber, packed bed section and/or at least one other separation device is recycled in a water treatment section together with the process water used in the separation devices. Recycling the water in the water treatment section can encompass removal of solids, removal of incondensable gases and/or indirect cooling. In case of high concentration of dissolved gases in the water like CO, $CO_2$, $NH_3$, $H_2S$, these components can be stripped off in a stripping system by conventional distillation. Then, the acid gas can be treated in an acid gas treatment section before venting it to the atmosphere. Depending on the concentration of these impurities in the acid gas, a proper gas purifying process can be established, like a Claus type or liquid oxidation process. The collected water can then be recirculated and used in the different equipment as cold process water.

In an even more preferred embodiment of the invention, recycled water is supplied to a water electrolysis plant or a steam reforming plant that produces hydrogen. The produced hydrogen is supplied to the preheating section as fuel and/or to the reduction section as reduction gas and/or to the fired gas heater as fuel. The use of fresh make-up water as the educt to produce the required hydrogen would demand significant fresh water volume flows, which in certain regions around the world are not available, too expensive or would create significant public opposition. Therefore, closing the water loop between the direct reduction process and the hydrogen generating process minimizes the make-up water consumption.

The water electrolysis process allows for the selection of renewable electricity as the energy source instead of fossil fuels like natural gas. Demineralized water and electric power are the main requirements to produce hydrogen and oxygen by water electrolysis. The integration of the water electrolysis process into the direct reduction process is based on using hydrogen as the main product from the water electrolysis plant in the reduction process. Hydrogen can be used as single reductant in the reduction stage.

Another aspect of the invention is to reduce the $CO_2$ and increase the $H_2O$ concentration in the off-gas of the different combustion processes by replacing natural gas by hydrogen, partly or completely. The reason for this aspect is the general tendency of a carbon free economy, coupled with the observation that it is easier and more economic to produce clean renewable hydrogen than to produce clean renewable hydrocarbons. It is also part of the invention to recover liquid water from the iron ore reduction plant, treat it in the water treatment section and recycle it back to the water electrolysis process as feed water for hydrogen and oxygen production. Thereby, the water is produced in the first process and consumed in the second process, closing the water loop and dramatically reducing the fresh water consumption.

There are three main water electrolysis technologies: alkaline water electrolysis, proton exchange membrane electrolysis (PEM) and solid oxide electrolysis. All of them can be used in the present invention; nevertheless the preferred one is the alkaline water electrolysis because it is the more mature and commercially available technology. The pressurized alkaline water electrolysis process is preferred, with a pressure higher than 6 bar in order to be able to feed the hydrogen to the respective stages of the direct reduction plant without additional compression. Hydrogen and oxygen storage tanks can be used to have a backup in case of process fluctuations. Optionally, hydrogen can be liquefied to have even larger backup compared to gas phase storage. Pressurized alkaline water electrolysis is also less restrictive in terms of dissolved solids content in the feed water than the PEM water electrolysis. In the case of water electrolysis (alkaline as well as PEM water electrolysis), the water consumption is 0.85-0.9 kg $H_2O/Nm^3$ $H_2$.

The most common process used to produce hydrogen at large scale having natural gas or similar hydrocarbons available, is the steam-methane reforming followed by a shift reactor and pressure swing adsorption. Also in this case, the water condensed in the reduction process can be used as make-up water in the hydrogen production process, after appropriate water treatment as described above. The typical water consumption, especially boiler feed water, for hydrogen production in a steam methane reforming plant with shift reactor is 0.5-0.6 kg $H_2O/Nm^3H_2$ without steam export.

In another even more preferred embodiment of the invention, the warm process water is divided into two partial streams, wherein one partial stream is cooled to 25-30° C. and recirculated back to the separation devices and the second partial stream is de-ionized and fed to the water electrolysis plant or steam reforming plant.

In another, even more preferred embodiment of the invention, the oxygen generated in the water electrolysis plant is supplied to the preheating section and/or the gas heaters for the combustion of fuel. It is used to enrich air for the combustion of fuel, thereby decreasing the energy and water vapor losses in the off-gas streams. Increasing the oxygen concentration in the combustion air leads to lower off-gas volume flow, since the $N_2$ throughput is decreased, allowing for a reduction of energy and water vapor losses in the final off-gas. The use of pure oxygen or enriched air e.g. in the preheating section can decrease the size of the equipment favoring Capex (Capital expenditure or capital expense is an expense where the benefit continues over a long period) and can decrease the fuel consumption favoring Opex (An operating expense, operating expenditure, operational expense, operational expenditure is an ongoing cost for running a product, business, or system). In cases where a high oxygen concentration is needed, e.g. in the preheating section to favor oxidation reactions of ilmenite or magnetite ore, the oxygen from water electrolysis can be used without creating an excessively high air volume flow in the system.

The object is further solved by a plant for the thermal treatment of iron containing oxide.

It comprises a preheating calcining stage, for heating up fine-grained solids and a reduction stage, for reducing the heated solids by exposure to a reduction gas comprising hydrogen, wherein an off-gas outlet of the reduction stage is connected to a separation device for separating water from the off-gas of the reduction section. The off-gas outlet of the preheating calcining stage is connected to a venturi scrubber with a packed bed section arranged downstream of the venturi scrubber for separating liquid water. The packed bed section can comprise a water inlet for spraying process water on the packed bed and is arranged for countercurrent flow of the off-gas. The packed bed contains irregular shaped PE tellerettes or other packings to increase the contact surface area between the process water and the off-gas. The inventive plant has reduced fresh water consumption, making it ecologically and economically feasible for regions with sparse and/or expensive water resources.

In a preferred embodiment of the invention, a water outlet of at least one separation device is connected to a water treatment section for recycling the separated water. Hence, the water can be recycled in order to fit the requirements for recirculating the water to the several stages of the plant.

In another preferred embodiment of the invention, the water treatment section comprises a thickener with a filter press for the filtration of underflow slurry and/or with a covered water surface. In the water treatment section, the slurry from the different stages and sections of the plant is first treated in a thickener to obtain clear water from the thickener overflow with a level of suspended solids low enough to be recycled back into the process, especially for the venturi scrubbers. Flocculant and/or coagulant is used to accelerate agglomeration of particles to form larger particles or clusters that settle down. A significant water vapor loss would occur in the thickener due to evaporation to the atmosphere from the water surface of the thickener due to the open surface and the high temperature of the water in the thickener. To avoid such water vapor losses, the water surface can be covered by a roof installed on top or by gas filled plastic balls covering the water surface in the thickener.

The water content in the thickener underflow slurry is normally disposed of and partially lost by evaporation in settling ponds. To avoid these losses, water from the underflow sludge can be recovered using a filter press, resulting in a solids cake having very low water content. The additional water recovered from the filter press is recycled back to the thickener.

It is also possible that the water treatment section comprises a warm water tank for chemical treatment. In this case, clear water from the thickener is sent to the warm water tank. Warm water from the cooling columns of the gas heater, which has been utilized for cooling and condensing the water vapor in the off-gas of the gas heater, can be sent directly to the warm water tank, bypassing the thickener, because this water contains very little or no solids. A chemical treatment may be done in the warm water tank to prevent corrosion in piping and equipment, and to control the pH-level.

A portion of water is optionally bled through the bottom of the warm water tank in order to avoid accumulation of salts and impurities in the water loop. The bleed water stream can be utilized to control the temperature of the final product (HBI) at the tail end of the briquette-cooling conveyor. If necessary, aeration can be applied in the warm water tank to remove small quantities of dissolved gases as $CO_2$, $H_2S$ and $NH_3$ by pumping air into the water through a gas distributor plate, perforated pipes, strainers, or tubes. If the amount of environmentally harmful components as $H_2S$ and $NH_3$ released in the warm water tank is not acceptable, then the gases can be sent to an acid gas treatment section before being released to the ambient. The acid gas treatment can be done through conventional Claus sulfur recovery process or a liquid phase oxidation process in order to convert hydrogen sulfide to elemental sulfur in the solid phase.

In another addition or alternative embodiment of the invention, the water treatment section comprises air fan coolers and/or a chiller for cooling the water. Cooling down the clear water from the thickener overflow in an evaporative cooling tower would result in water losses due to saturation of the cooling air and entrainment of water droplets. The use of indirect cooling by an air fan cooler avoids these losses.

In the reduction process, water byproduct from reduction reactors is condensed and collected in a venturi scrubber with downstream packed bed. However, the mass flow of condensed water vapor can be increased by using a chiller to cool the process water being sprayed onto the packed bed of the scrubber. The liquid water is preferably gained at temperatures below 40° C., even more preferably below 30° C. Typically, a chiller or refrigeration system for cooling the process water is required to achieve this. The achievable gain of additional water is relatively small. But at the same time the reduction potential of the recycled reduction gas is increased, allowing for quicker reduction of the iron ore.

After chemical treatment and degasification in the warm water tank, the warm water can be split in two major streams. A first stream is sent to the cooling system with indirect heat exchange in order to recycle it back to the same scrubbing systems and cooling columns as process water. The second stream is treated in additional water treatment systems before it is sent to a water electrolysis plant. The process water to be recirculated to the venturi scrubbers and cooling columns is cooled down to 25° C. to 30° C. The combination of air fan coolers and a chiller is the preferred arrangement because water is indirectly cooled avoiding the high water losses of conventional evaporative cooling towers. The main target of the water chiller system is to cool down the water from a range between 40 and 50° C. to a range between 20 and 30° C. for proper removal of water vapor in the gas scrubbers and cooling columns and/or packed beds. The water chiller can be the standard vapor-compression chillers, absorption or adsorption chillers. Chilled water is then recirculated to the gas scrubbers. The arrangement of an indirect cooling system using air fan cooler and chiller and the type of refrigerant depends on the ambient conditions. The chiller can be combined with closed loop water heat exchangers and air fan coolers to remove heat to the atmosphere without losing water by evaporation.

Preferably, the water treatment section comprises a water filter and an ion exchange device. Therein, the second portion of the clear water from the warm water tank is treated in additional equipment to achieve the required specification of the water electrolysis feed water. In the case of alkaline water electrolysis, the maximum allowable feed water conductivity is typically specified as 5 µS/cm (Grade 3, ISO 3696, 1987), for PEM electrolyzers the specification is even lower (0.1 µS/cm to 1 µS/cm, grade 2 ISO 3696, 1987). To achieve the required specifications, suspended solids and dissolved solids must be removed from the water.

Standard filtration and deionization methods normally lead to a water quality required in alkaline water electrolysis. In this context, filtration is used to remove suspended solids using silica sand and/or anthracite as filter media. For organic matter activated carbon filter media are also used. Subsequently, dissolved solids are removed using standard cation-anion exchange device(s). Here, non-desirable ions are exchanged by non-objectionable ions (most of them hydrogen ions and hydroxyl ions, forming pure water) using plastic beads resin, polymers or comparable materials composed by charged functional group. A regeneration system is used to remove contaminants from the respective material to recover its exchange capacity. For regeneration, typically strong acid and caustic are used to permeate the pores, displace the contaminants and leave the active $H^+$ and $OH^-$ ions in the resin, polymers or comparable materials. For more stringent specifications, other methods for water deionization as membrane processes should be considered (microfiltration, reverse osmosis, ultrafiltration, etc.).

The make-up water can be added to the water loop upstream of the water filters or downstream of the air fan cooler system. In case of high concentration of dissolved gases in the water like CO, $CO_2$, $NH_3$, $H_2S$, these components can be stripped off by conventional distillation.

Acid gases resulting from the above-described purification are usually treated in an acid gas treatment section before venting them to the atmosphere. Depending on the concentration of these impurities in the acid gas, a proper gas purifying process like a Claus type or liquid oxidation processes is established.

Further features, advantages and possible applications of the invention can be taken from the following description of the drawings and the exemplary embodiments. All features described and/or illustrated form the subject-matter of the invention per se or in any combination, independent of their inclusion in the claims or their back-reference.

Figure 1:
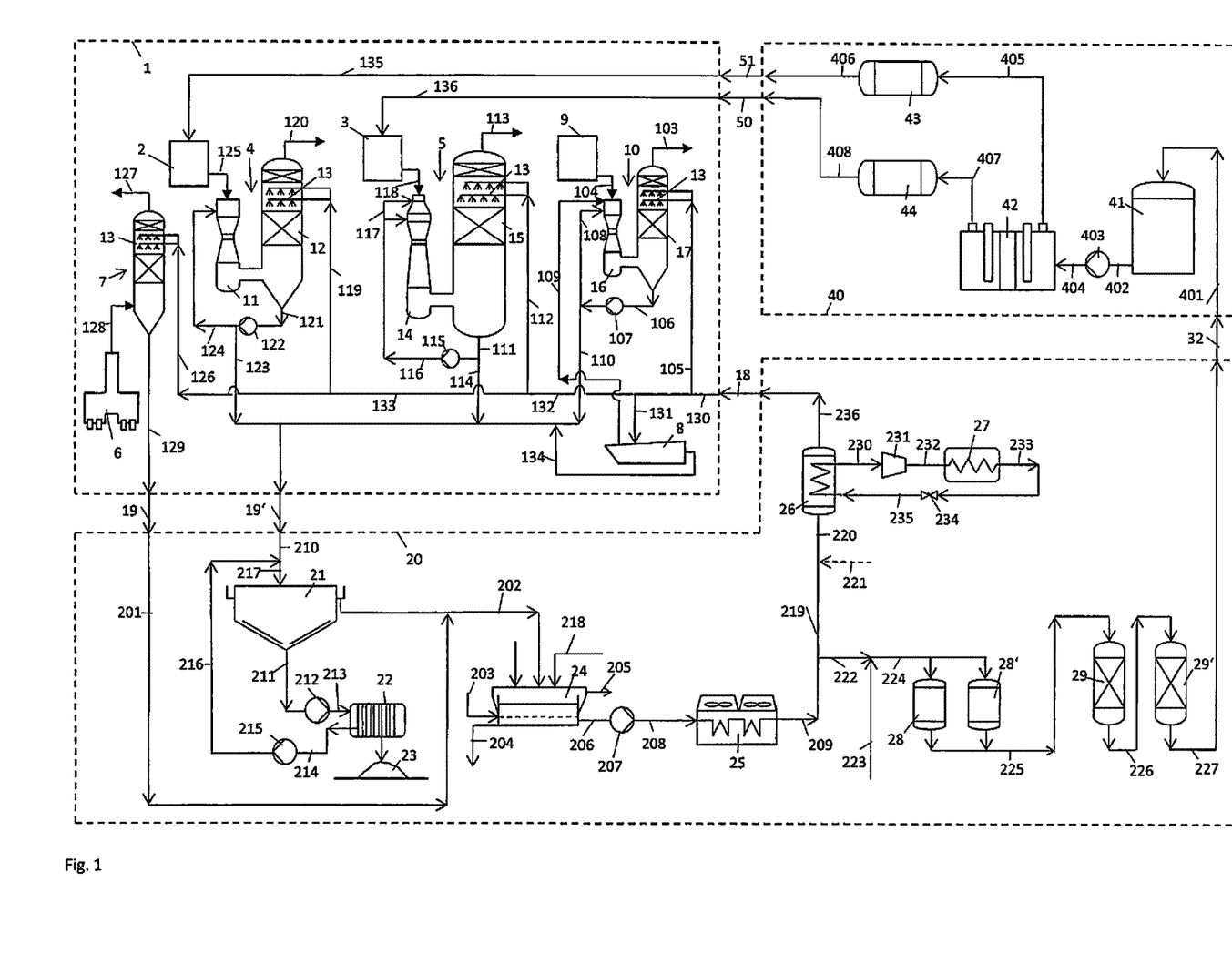
FIG. 1 shows a first embodiment for the thermal treatment of iron containing oxide.

FIG. 1 shows an inventive plant for the thermal treatment of fine-grained solids, particularly iron containing oxides. An exemplary plant has an output of 500.000 tons per year of hot briquetted iron (HBI). This plant consists of the plant 1 for thermal treatment of solids, the water treatment plant 20 and the water electrolysis plant 40.

The plant 1 comprises a preheating calcining stage 2, which is typically realized as a circulating fluidized bed reactor. However, also other reactor types are possible. Fuel gas and/or oil (natural gas and/or similar gaseous or liquid hydrocarbons and/or hydrogen) and bleed gas from the reduction stage 3 are supplied to the preheating calcining stage 2 and burned with excess of air to heat the moist solids. A typical temperature range is 900 to 1100° C. The off-gases are guided via conduit 125 to a separation device 4. In a typical but not restricting embodiment, 36370 $Nm^3$/h of off-gas with a temperature of 215° C., is produced in the preheating calcining stage 2.

Separation device 4 comprises a venturi scrubber 11 to remove solids and for cooling to vapor/liquid equilibrium. Further, the separation device 4 comprises a packed bed section 12 to condense the water vapor with an upward flow of the off-gas and a countercurrent downward flow of cold process water. Cold process water is supplied via conduit 119 to the water spray nozzle 13, through which is dispersed above the packed bed in such a way that the water drips downwards through the packed bed 12. The packed bed 12 contains packings that create a large surface area to improve the contact between the falling process water droplets and the rising off-gas, e.g. irregular shaped polyethylene tellerettes or other. For the above given off-gas flow, 190 $m^3$/h of cold process water with a temperature between 20 and 30° C. are needed.

The water discharged at the bottom of separation device 4 via conduit 121 has a mixing temperature (for the given example values: 55 to 70° C.) and is at least partly recirculated to the venturi scrubber 11 by means of the pump 122 via conduit 124 and at least partly supplied to a water treatment plant 20 via conduit 123. The off-gas, exiting the separation device 4 via conduit 120 is cooled and saturated with water vapor. It is essential that it contains only small amounts of residual water vapor, like for the given example 1.1 t/h. In comparison, the amount of water collected in the preheating calcining stage by condensing water vapor in the packed bed section 12 is approximately 10 t/h for an iron ore moisture of 5%.

Solids from the calcination stage 2 are passed in a not-shown way to the reduction stage 3, in which hydrogen gas is used to remove oxygen from the heated solids, particularly the iron ore, producing metalized iron and water as a byproduct. For the given example, the off-gas generated in the reduction stage 3 and discharged via conduit 118, has a temperature of 275° C. and a volume flow of approximately 310 000 Nm³/h of off-gas are generated.

The off-gas is guided to the separation device 5 comprising a second venturi scrubber 14 to remove solids and cooling to vapor/liquid equilibrium. The separation device 5 of the reduction stage 3 also comprises a packed bed section 15 to condense the water vapor with an upward flow of the off-gas and a countercurrent flow of cold process water, which is supplied by a water spray nozzle 13 above the packed bed such that the water drips downwards through the packed bed. In principle, the design is similar to the separation device 5. For the given example, approximately 870 t/h of process water at a temperature of 20 to 30° C. are sprayed onto the packed bed 15 via conduit 112 and spray nozzle 13. The amount of water recuperated in the packed bed 15 is 28 t/h. The residual water vapor mass flow in the off-gas discharged via conduit 113 amounts to approximately 3 t/h. The water discharged at the bottom of separation device 5 via conduit 111 is at least partly recirculated to the venturi scrubber 14 by means of the pump 115 via conduits 116 and 117 and at least partly supplied to a water treatment plant 20 via conduit 114.

The reduction section 3 further comprises three fired gas heaters 6, where gaseous and/or liquid fuel (natural gas and/or fuel oil and/or bleed gas and/or hydrogen) is burned with air, oxygen or enriched air, producing $CO_2$ and/or $H_2O$ vapor in the off-gas, e.g. with a temperature of 230° C. The off-gas of this combustion is guided via conduit 128 through a packed bed column 7 with upward gas flow and with countercurrent flow, e.g. of 160 t/h of cold process water fed via conduit 126 and spray nozzle 13, to condense most of the water vapor contained in the off-gas. Using a mixture of natural gas and bleed gas (from the reduction process) as fuel in the fired gas heaters, the amount of water vapor condensed in the packed bed column 7 is 7 t/h in a Circored plant with a capacity of 500 000 tons HBI per year. The residual water vapor in the off-gas vented to the atmosphere via conduit 127 results in a water loss of 1.4 t/h. The water is collected at the bottom of the packed bed column 7 and discharged to the water treatment plant 20 via conduit 129.

The metallized iron is then transported via a not-shown line to the briquetting machine area 9 to produce HBI, which is then transported into a vibratory cooling conveyor 8, where the briquettes are quench cooled to avoid re-oxidation. For the example, 260 t/h of cold process water are supplied to the vibratory cooling conveyor 8 via conduit 131 and 250 t/h of heated process water are discharged from the vibratory cooling conveyor 8 via conduit 134 and fed to the water treatment plant 20, while 10 t/h of water vapor are leaving the vibratory cooling conveyor via conduit 109. More than 90% of this water vapor are condensed and recovered in the waste gas scrubber 10 comprising a venturi scrubber 16 and a packed bed section 17 arranged downstream of the venturi scrubber 16. Other waste gas streams from the briquetting machine area 9 can also be fed to the waste gas scrubber 10 via conduit 104.

For the values given as an example, approximately 180 t/h of cold process water are supplied to the waste gas scrubber 10 via conduit 105. The water discharged at the bottom of separation device 10 via conduit 106 is at least partly recirculated to the venturi scrubber 16 by means of the pump 107 via conduit 108 and at least partly supplied to a water treatment plant 20 via conduit 110. The cleaned, cooled and water saturated waste gas leaves the waste gas scrubber 10 via conduit 103.

If the dust load of the waste gas streams is low, it is also possible to use a pure packed bed section 17 without a venturi scrubber 16.

The total discharge 19 and 19' of heated process water from the iron ore reduction plant 1 to the water treatment plant 20 amounts to approximately 1700 m³/h. The smaller flow 19 (approximately 170 t/h) is practically free of solids, while the larger flow 19' is loaded with solid particles.

The first step in the water treatment plant 20 is to separate the solids from the water flow 19' by feeding it into a thickener 21 via conduit 210 and 217, where clear water overflows the rim of the thickener and is fed to the warm water tank 24 via conduit 202, while the sludge is collected at the bottom of the thickener 21. Flocculant and/or coagulant is used in the thickener 21 to accelerate agglomeration of particles to form larger particles or clusters that settle down by gravity. To avoid water losses in the thickener 21 through evaporation, it can be enclosed by a roof installed on top of the water surface with the possibility for condensate to drip back into the thickener 21. The underflow sludge is discharged from the thickener 21 by means of conduit 211 and fed to a filter press 22 by pump 212 and conduit 213, leading to a filter cake 23 with very low water content. The water recovered from the filter press 22 is recycled back to the thickener 21 via conduit 214, pump 215 and conduit 216.

The warm process water flow 19 from the cooling columns 7 of the gas heaters 6 is sent directly to the warm water tank 24 via conduits 201 and 202, bypassing the thickener 21, since this water has low or no solids content and, therefore, no treatment in the thickener 21 is necessary.

A chemical treatment is done in the warm water tank 24 by feeding the appropriate chemicals into the warm water tank 24 via conduit 218 to prevent corrosion in the piping and other equipment, and to control the pH-level. A portion of the water (e.g. 10 m³/h) is bled from the bottom of the warm water tank 24 via conduit 204 in order to avoid accumulation of salts and impurities in the water loop. The bleed can be utilized to control the temperature of the final product (HBI) by water evaporation at the tail end of the vibratory cooling conveyor. Aeration is also done in the warm water tank 24 to remove small amounts of dissolved gases as $CO_2$, $H_2S$ and $NH_3$, by pumping air into the water via conduit 203 and distributing it in the warm water tank by means of a gas distributor plate, perforated pipes, or tubes. The aeration causes the dissolved gases to be transferred to the gas phase. The aeration air together with the removed gases is released to the atmosphere via conduit 205.

After chemical treatment and degasification, the warm water is fed via conduit 206, pump 207 and conduit 208 to an air fan cooler 25 with indirect heat transfer to pre-cool the water, e.g. to 43° C. Subsequently, the water transported via conduit 209, is split into two major conduits 219 and 222. Water transported via conduit 219 (in the example featuring 1660 m³/h) is sent via conduit 220 to a further cooling system with a chiller 26, a compressor 231, a condenser 27, an expansion valve 234 and the connecting conduits 230, 232, 233 and 235. The main target of the water chiller system is to cool down the process water dedicated for the separation devices 4, 5, 10 and cooling columns 7. The chiller 26 can be a standard vapor-compression chiller or an absorption or adsorption chiller. In the given example, the clear process water is cooled from a range between 40 and 50° C. to a range between 20 and 30° C., preferably between 20 and 28° C., for highly efficient removal of water vapor in the iron ore reduction plant 1.

Chilled process water is then recirculated to the separation devices 4, 5, 10 and the cooling column 7 via conduits 236, 130, 132 and 133 as process water supply 18 to the iron ore reduction plant 1. The specific arrangement and design of the indirect cooling system with an air fan cooler 25 and a chiller 26 together with the used type of refrigerant depends on the ambient conditions at the location of the iron ore reduction plant 1. The chiller 26 can be combined with a closed loop water heat exchanger and air fan cooler to remove heat to the atmosphere in an efficient and safe way.

Water transported via conduit 222, in the example featuring 34 t/h, is treated in additional water treatment systems before it is sent to the water electrolysis plant 40 via conduit 227. The additional treatment of the process water for removal of remaining suspended solids, organic matter, dissolved solids and gases is necessary to accomplish the requirements for water electrolysis. To achieve the required specifications, suspended solids and dissolved solids are removed from the water. In the case of alkaline water electrolysis, the feed water conductivity is typically specified as 5 µS/cm. Typically, the standard filtration—deionization method is used to achieve the required water quality.

Water is fed via conduit 224 to the water filters 28 and 28' to remove suspended solids using silica sand and/or anthracite as filter media. For organic matter activated carbon filter media is also used. Subsequently, water discharged via conduit 225 is fed to a ion exchange device 29/29' like a cation/anion resin reactor or a cation/anion resin polymer for removing dissolved solids. Non desirable cations and anions are removed by exchange with hydrogen and hydroxyl ions respectively, forming pure water.

Typically, the ion exchange devices are small plastic beads that are composed of organic polymer chains that have charged functional groups either positive or negative. Ions in the water will be attracted by respective charged functional group in the resin, the polymer or comparable materials and non-harmful weaker ions will be release to the water. Ions can be removed in separated devices connected in series via conduit 226, or in a more efficient mixed bed device containing at least two types of resin, polymer or comparable materials. A regeneration system (not shown in the figures), must be used when removal capacity of the resins becomes exhausted. Typically, strong acid and caustic are used to permeate the resin pores, displace the contaminants and leave the active H+ and OH− ions in the respective resin, polymer or comparable material. For more stringent specifications of water purification (e.g. for PEM electrolyzers), other methods as membrane processes can be considered (microfiltration, reverse osmosis, ultrafiltration, etc.).

Additionally, make-up water may be added to the water loop upstream of the water filters 28 via conduit 223 and/or downstream of the air fan cooler system 25 via 221. Typically, the flow of make-up water is adjusted in such a way, that the water level in the warm water tank 24 is kept at the desired height.

Finally, the de-ionized water 32 is sent to a feed water tank 41 in the water electrolysis plant 40 via conduit 401. Preferably, the water electrolysis plant 40 uses the pressurized alkaline water electrolysis technology. Therefore, the purified water (in the example 34 t/h) is fed from the feed water tank 41 to the pump 403 via conduit 402 and then to the electrolysis units 42 via conduit 404. The electrolysis units comprise an anode, a cathode and a diaphragm arranged between the two. An electrical voltage is applied between the anode and the cathode, wherein hydrogen is released at the cathode and oxygen is released at the anode. The oxygen is fed to an oxygen storage tank 43 via conduit 405, while the hydrogen is fed to a hydrogen storage tank 44 via conduit 407. For the given example, 20000 Nm$^3$/h of oxygen 51 are supplied to the oxygen consumers in the iron ore reduction plant 1 via conduit 406 and 40000 Nm$^3$/h of hydrogen 50 are supplied to the respective hydrogen consumers in plant 1, especially the reduction stage 3, via conduit 408.

Figure 2:
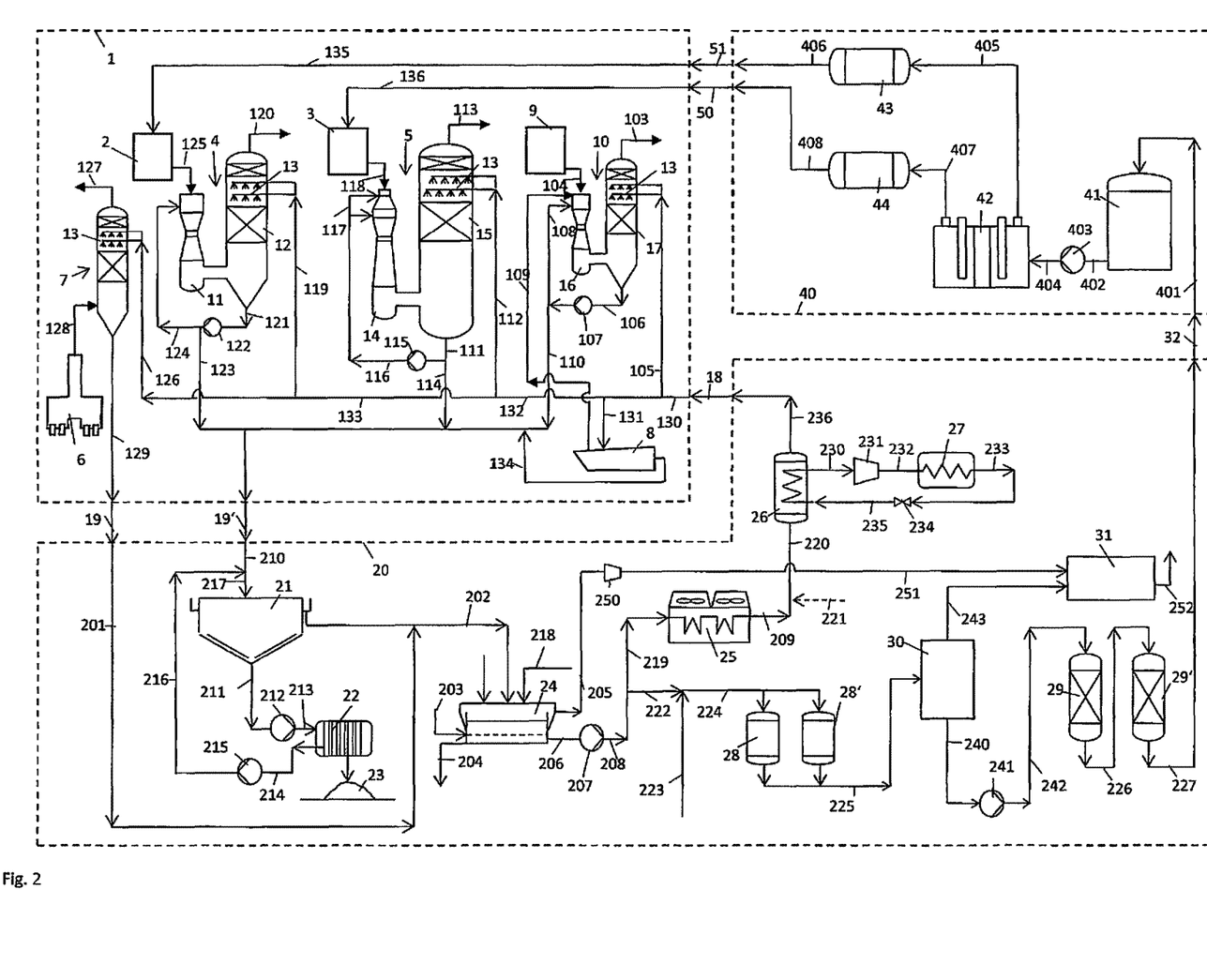
FIG. 2 shows a second embodiment for the thermal treatment of iron containing oxide.

FIG. 2 shows a second embodiment of the invention. It refers to the case of high concentration of dissolved gases as CO, $CO_2$, $NH_3$, $H_2S$ in the process water, where an additional water treatment process must be established. For example, a conventional stripping system 30 for degasification of the water by distillation, followed by an acid gas treatment unit 31 are included in the process flowsheet. Because of the high concentration of dissolved gases in the process water, the off gases from pre-degasification done in the warm water tank 24, must be sent via conduit 205, fan 250 and conduit 251 to the acid gas treatment unit 31. Since the stripping system 30 requires an elevated water temperature, e.g. 60° C., the separation of the two partial water streams in conduits 219 and 222 is done upstream of the air fan cooler 25.

In another embodiment of the invention, not shown in any of the figures, hydrogen is not only used as a reductant in the reduction section 3, but also as the single fuel in the preheating section 2 and in the gas heaters 6. In this case, only nitrogen, oxygen and a very small amount of water vapor will be released to the atmosphere without any $CO_2$ emission. In this case, a higher consumption of hydrogen in plant 1 is expected (e.g. 55000 Nm$^3$/h). It is also possible to use a mix of fuels (e.g. hydrogen and natural gas) in the preheating section 2 and/or in the gas heaters 6.

A variant to the embodiment shown in FIGS. 1 and 2, is the use of oxygen 51 from the electrolysis plant to enrich the combustion air utilized in the gas heaters 6. For example, the enrichment of the combustion air to e.g. 35 v/v-% $O_2$ decreases the gas volume flow through the gas heaters 6, e.g. by 35 v/v-%. As a consequence, less process water is required in the cooling columns 7 to cool the off-gas. To avoid an increase of the $NO_x$ emissions, off-gas recycling can be considered.

REFERENCE NUMBERS

1 Plant for thermal treatment of solids
2 preheating calcining stage
3 reduction stage
4 preheating separation device
5 reduction section separation device
6 gas heater
7 gas heater separation device
8 vibratory cooling conveyor
9 briquetting machine area
10 waste gas separation device
11 preheating venturi scrubber
12 preheating packed bed section
13 water spray nozzle
14 reduction stage venturi scrubber
15 reduction stage packed bed section
16 waste gas venturi scrubber
17 waste gas packed bed section
18 process water supply to plant for thermal treatment of solids
19,19' process water discharge from the plant for thermal treatment of solids
20 water treatment plant
21 thickener
22 filter
23 filter cake 24 warm water tank
25 air fan cooler
26 chiller
27 condenser
28, 28' water filter
29, 29' ion exchange device
30 stripping system
31 acid gas treatment unit
32 de-ionized water supplied to water electrolysis plant
40 water electrolysis plant
41 pure water tank
42 electrolysis unit (s)
43 oxygen storage tank
44 hydrogen storage tank
50 hydrogen supply to the reduction section
51 oxygen supply to preheating section
103-106 conduit
107 pump
108-114 conduit
115 pump
116-121 conduit
122 pump
123-134 conduit
201-206 conduit
207 pump
208-211 conduit
212 pump
213,214 conduit
215 pump
216,217 conduit
219-227 conduit
230 conduit
231 compressor
232,233 conduit
234 valve
235,236 conduit
240 conduit
241 pump
242, 243 conduit
250 fan
251,252 conduit
252 pump
401,402 conduit
403 pump
404-408 conduit

The invention claimed is:

1. A method for the thermal treatment of iron containing oxide, in which fine-grained solids are heated in a preheating calcining stage and are exposed to a reduction gas in a subsequent reduction stage, wherein off-gas from the reduction stage is guided through a separation device, separating water originating from the reduction stage, wherein off-gas from the preheating calcining stage is guided through a venturi scrubber and a packed bed section downstream of the venturi scrubber to condense water vapor, wherein water separated in the separation device is recycled into a water treatment section, from which the recycled water is supplied to at least one of a water electrolysis plant or a steam reforming plant producing hydrogen, and that the produced hydrogen is supplied to at least one of the reduction stage as reductant, to the preheating calcining stage as fuel, to a gas heater as fuel, or from which the recycled water is supplied to the separation device as process water, wherein the process water exchanges heat with the off-gas, is cooled in the water treatment section and is recirculated to the separation device, wherein oxygen generated in the at least one of the water electrolysis plant or the steam reforming plant is supplied to at least one of the preheating calcining stage or the gas heater for the combustion of fuel.

2. The method according to claim 1, wherein at least one of the preheating calcining stage or the reduction stage comprises a fluidized bed reactor.

3. The method according to claim 1, wherein at least one of the preheating calcining stage or the reduction stage comprises a circulating fluidized bed reactor.

4. The method according to claim 1, wherein at least one of the preheating stage or the reduction stage is heated with at least one gas heater, and that the off-gas from the at least one gas heater is guided through a separation device to condense water vapor.

5. The method according to claim 1, wherein the downstream of the reduction stage the reduced solids are cooled in a quench cool, and that the off-gas from the quench cool is guided through a separation device to condense water vapor.

6. The method according to claim, 5 wherein the quench cool is a vibratory cooling conveyor.

7. The method according to claim 1, wherein at least one of the hydrogen content in the reduction gas is at least 85 v/v.-%, and/or the hydrogen content in a fuel gas used in the preheating stage is at least 20 v/v.-%, or the hydrogen content in a fuel gas used in at least one gas heater is at least 20 v/v.-%.

8. The method according to claim 1, wherein water treatment section includes removal of solids, removal of incondensable gases and indirect cooling.

9. A plant for the thermal treatment of iron containing oxide comprising a preheating calcining stage, for heating up fine-grained solids and a reduction stage, for reducing the heated solids by exposure to a reduction gas comprising hydrogen, wherein an off-gas outlet of the reduction stage is connected to a separation device to condense water vapor from the off-gas of the reduction stage, wherein an off-gas outlet of the preheating calcining stage is connected to a venturi scrubber and a packed bed section arranged downstream of the venturi scrubber to condense water vapor wherein a water outlet of at least one separation device is connected to a water treatment section for recycling water, that the water treatment section is coupled to at least one of a water electrolysis plant a steam reforming plant producing hydrogen as a reductant for the reduction stage, as a fuel for the preheating calcining stage, to a gas heater as fuel or that the water treatment section is coupled to at least one separation device to provide process water, which exchanges heat with the off-gas, is cooled in the water treatment section and is recirculated to the separation device, wherein oxygen generated in the at least one of the water electrolysis plant or the steam reforming plant is supplied to at least one of the preheating calcining stage or the gas heater for the combustion of fuel.

10. The plant according to claim 9, wherein the water treatment section comprises at least one of a thickener with a filter press for the filtration of underflow slurry or a covered water surface of the thickener.

11. The plant according to claim 9, wherein the water treatment section comprises a warm water tank for chemical treatment.

12. The plant according to claim 9, wherein water treatment section comprises at least one of an air fan cooler or a chiller for cooling the water.

13. The plant according to claim 9, wherein the water treatment section comprises at least one of a water filter or an ion exchange device.

\* \* \* \* \*